March 28, 1950 B. BANNISTER 2,502,364
COMBINED HYDRAULIC CLUTCH AND HYDRAULIC
TORQUE CONVERTER TRANSMISSION UNIT
Filed Feb. 13, 1945 4 Sheets-Sheet 1

Inventor.
Bryant Bannister
by J. Stanley Churchill
atty.

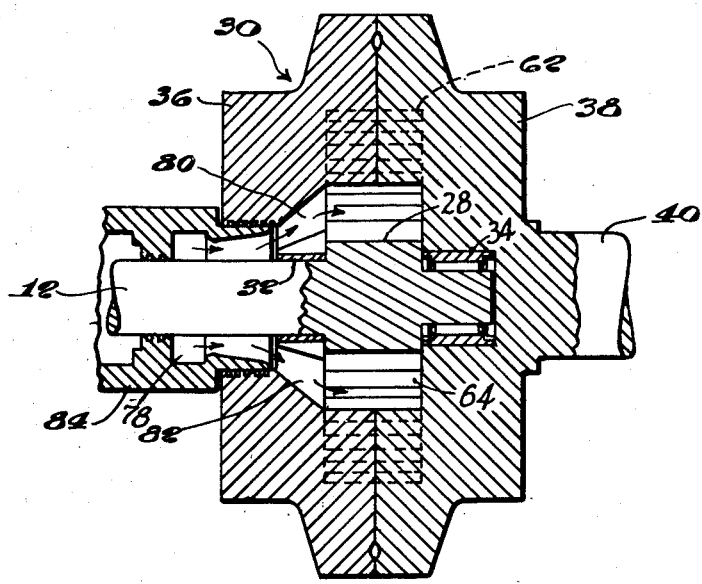
Fig. 4.
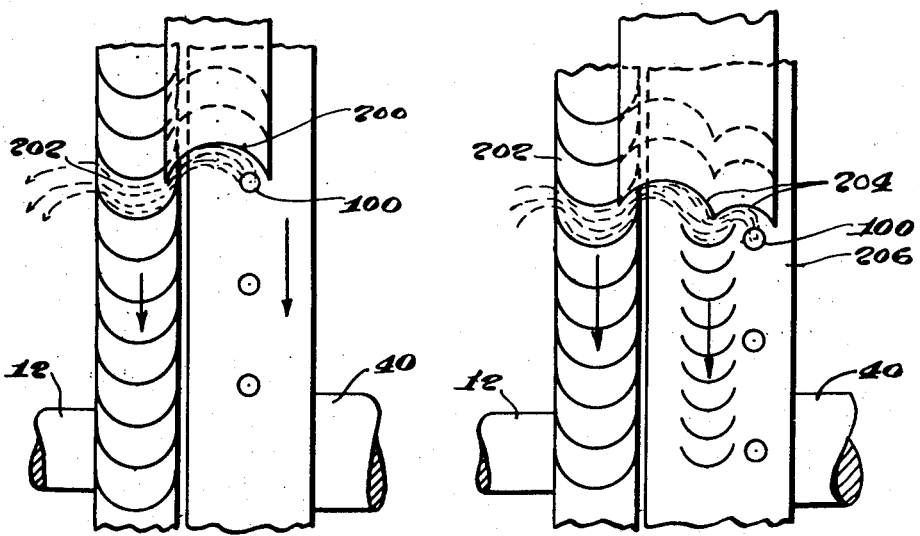
Fig. 6.
Fig. 7.
Inventor.
Bryant Bannister
by J. Stanley Churchill.
Atty.

Patented Mar. 28, 1950

2,502,364

UNITED STATES PATENT OFFICE 2,502,364

COMBINED HYDRAULIC CLUTCH AND HYDRAULIC TORQUE CONVERTER TRANSMISSION UNIT

Bryant Bannister, Pittsburgh, Pa., assignor to H. H. Robertson Company, Pittsburgh, Pa., a corporation of Pennsylvania Application February 13, 1945, Serial No. 577,602

13 Claims. (Cl. 60—54)

This invention relates to a torque converter and more particularly to an hydraulic torque converter.

The invention has for an object to provide a novel and improved torque converter of the character specified having a driving element, a driven element and connections between said elements arranged to automatically increase the torque exerted on the driven element as the resistance to rotation of said driven element is increased.

With this general object in view and such others as may hereinafter appear, the invention consists in the hydraulic torque converter and in the various structures, arrangements and combinations of parts hereinafter described and particularly defined in the claims at the end of this specification.

Figure 1:
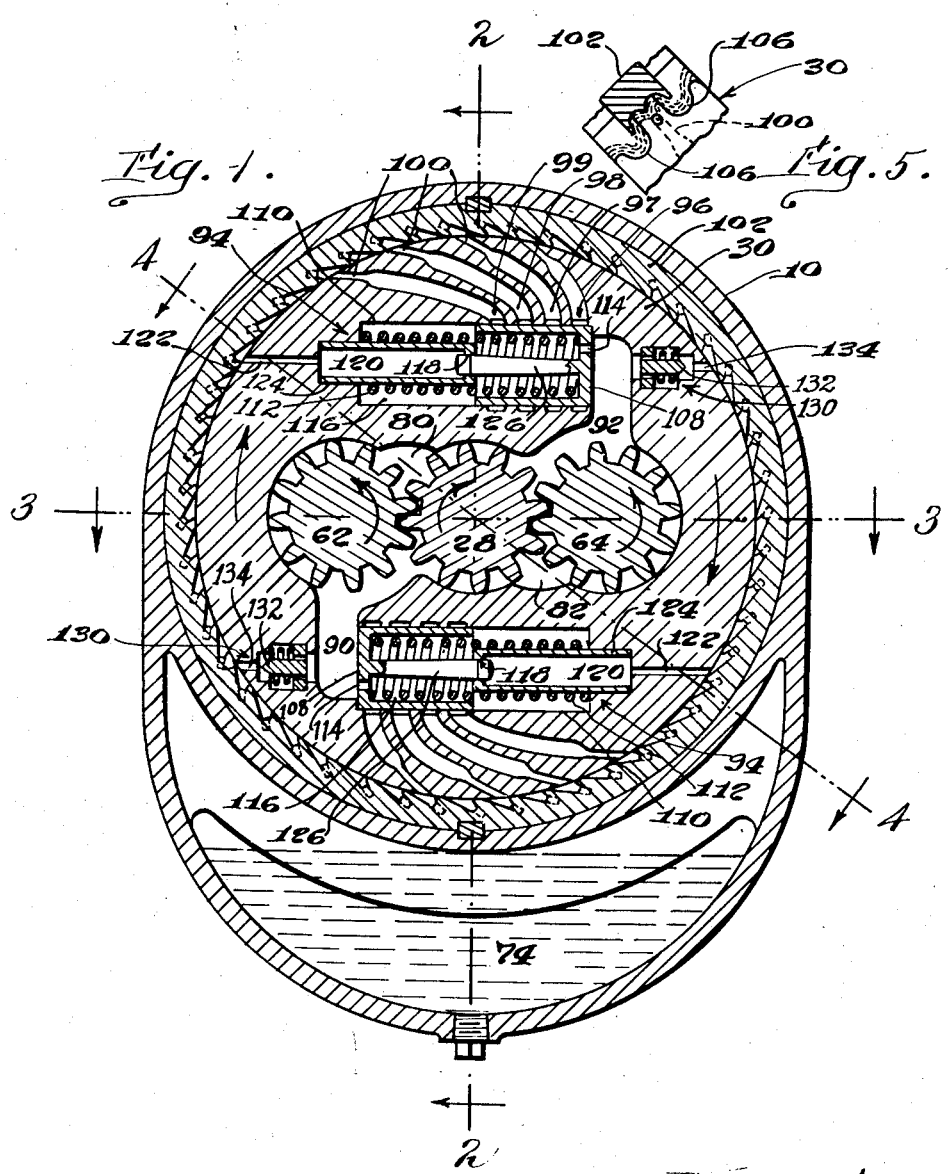
Figure 2:
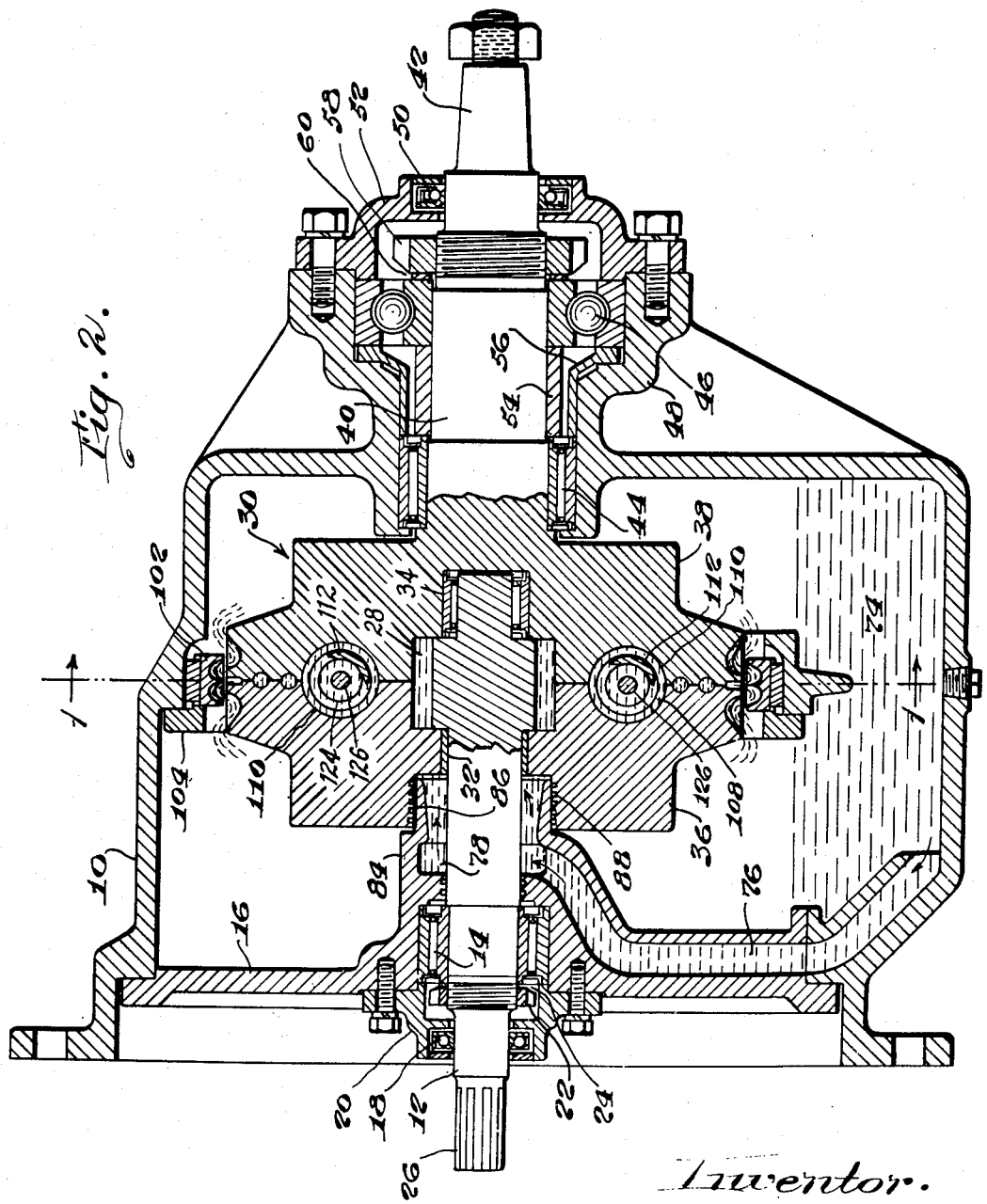
Figure 3:
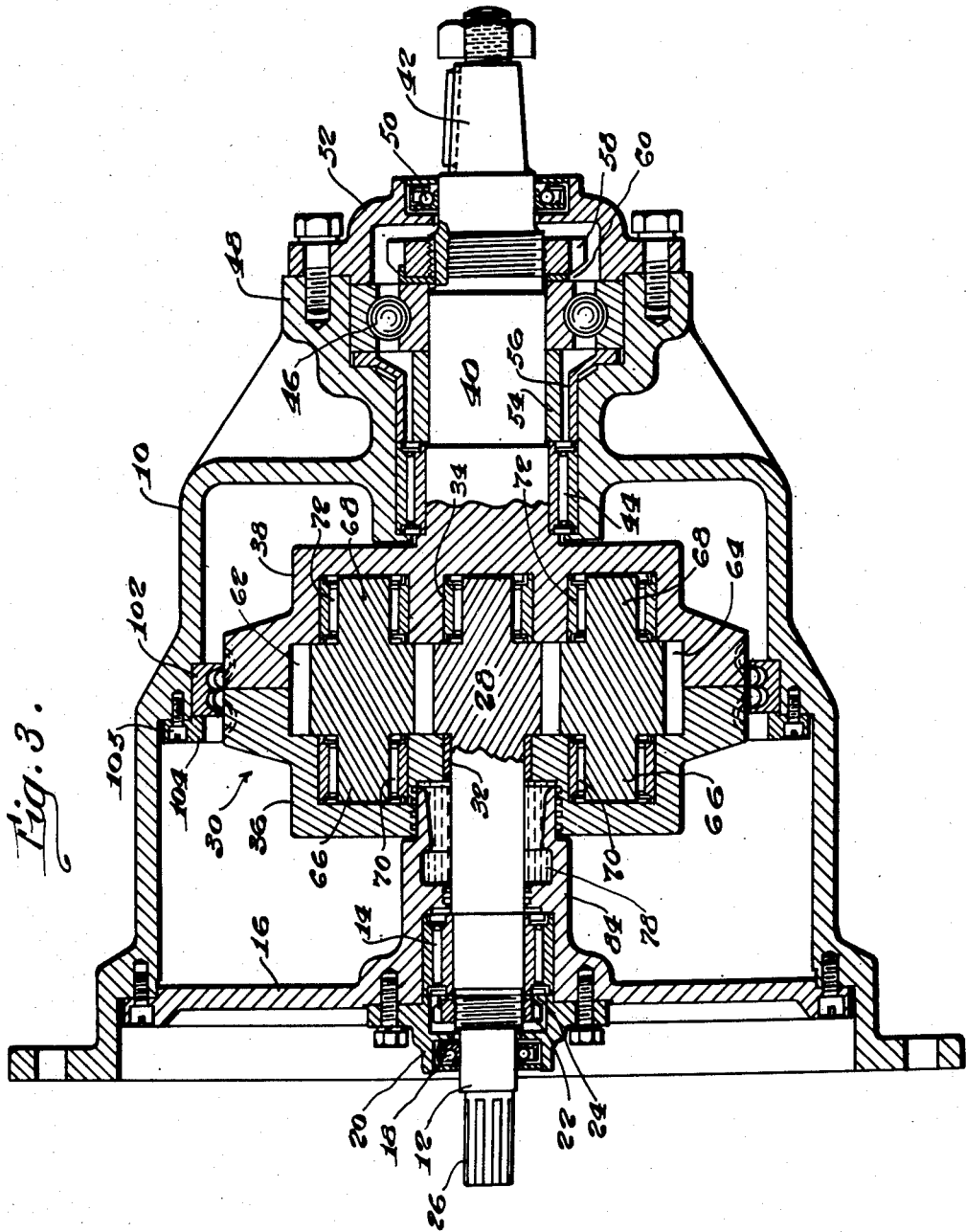

In the drawings illustrating the preferred embodiment of the invention, Fig. 1 is a cross sectional view of a torque converter embodying the present invention, the section being taken on the line 1—1 of Fig. 2; Fig. 2 is a view in cross section taken on the line 2—2 of Fig. 1; Fig. 3 is a similar view taken on the line 3—3 of Fig. 1; Fig. 4 is a partial view in cross section taken on the line 4—4 of Fig. 1; Fig. 5 is a detail view partly in cross section to be hereinafter referred to; Fig. 6 is a detail view diagrammatically illustrating a modified apparatus for use in the torque converter shown in Fig. 1; and Fig. 7 is a similar view illustrating another modification of the apparatus for use in the torque converter shown in Fig. 1, to be referred to.

In general, the present invention contemplates a torque converter embodied in an hydraulic transmission adapted for general use and which may be used with particular advantage under conditions where torque requirements take precedence over the requirement of a constant speed. Provision is made in the present device for transmitting power from a prime mover to the driven element either at substantially the same speed as the prime mover with a minimum power loss or at a lower speed with relatively greater torque output. To this end, the present torque converter is provided with control mechanism which automatically increases the torque of the driven element when the latter is placed under a load such as to reduce the speed thereof.

In the illustrated hydraulic transmission, a driving element comprising a rotating gear is confined within a cage or casing forming part of the driven element and which is rotatable about the same center as the driven element. The driving gear is arranged to mesh with at least one idler gear carried by and also confined within the casing. In operation, upon rotation of the driving element, the meshing gears serve as pumps to draw a fluid such as oil from a suitable reservoir and to deliver the fluid into a chamber formed within the cage or casing and to build up a pressure therein. When the pressure in the chamber is sufficient to overcome the resistance of the driven element, the idler gear becomes locked against rotation about its own axis, except for such minor movement as leakage would permit, so that the driver and the idler rotate as a unit to effect rotation of the casing or driven element. Under such conditions the casing rotates at substantially the same speed as the driving gear and a static pressure is built up in the chamber, the amount depending upon the torque delivered by the driver and the resistance to rotation imposed upon the driven element.

From the description thus far it will be observed that should the resistance to rotation of the driven element be increased, a state would be reached where the driver element would be forced to slow down, and if further resisted perhaps brought to a standstill and that during this transition the pressure in the chamber would continue to rise. In order to permit rotation of the driven element at a reduced speed under such conditions it would be possible to bleed fluid from the pressure chamber. However, when employing this expedient the torque delivered at such reduced speed would be substantially the same as that delivered by the driver, thus uselessly expending the static energy built up in the pressure chamber and providing an uneconomical manner of reducing the speed of the driven element with respect to the prime mover.

In accordance with the present invention provision is made for utilizing the static pressure built up in the chamber to increase the torque delivered by the driven element as its speed is reduced. To this end, spring loaded piston valves are provided in the cage, against which the pressure in the chamber acts to expose successive ports through which some of the fluid is permitted to escape, the stream being guided in a manner such as to react against the periphery of the driven member in turbine fashion to assist in rotating the driven member. In a modified form of the invention, the escaping fluid may be guided against a portion of the driving element, and in another embodiment, the stream may be divided to react partially against the driving element and partially against the driven element to assist in rotating such elements. Thus, the kinetic energy of the stream escaping from the chamber is recovered and added to the torque of the driven element imparted by the pump reaction to increase the resultant torque thereof as the resistance to rotation of the driven element is increased and the speed reduced.

Referring now to the drawings, as herein illustrated the present hydraulic transmission is supported in a housing 10 and includes a driving shaft 12 journaled in suitable anti-friction bearings including a roller bearing 14 supported in a flanged member 16 attached to and enclosing one end of the housing 10, and a sealing ring 18 supported in a flanged cap 20 attached to the member 16. A retaining nut 22 and washer 24 may be provided to bear against the roller bearing 14. The driving shaft 12 may be rotated through any usual or preferred source of power by connections to the outer end 26 thereof and, as herein shown, the shaft 12 is provided at its inner end with a gear 28 which is snugly fitted to rotate within a rotary cage or casing 30. The gear end of the driving shaft 12 is also provided with suitable bearings 32, 34 supported in the cage 30.

As illustrated in Fig. 2, the cage 30, forming the driven member of the unit, is conveniently made in two half sections 36, 38 joined together face to face in any suitable manner to form an integral unit, one half section 38 having a driven shaft 40 formed integrally therewith. The outer end 42 of the driven shaft extends beyond the housing 10 and may be designed for attaching suitable connecting means for transmitting the drive from the driven shaft. The driven shaft 40 is also journaled in suitable anti-friction bearings including a roller bearing 44 and a ball bearing 46 supported in a hub 48 of the housing 10, and an outer sealing ring 50 supported in a flanged member 52 attached to the end of the hub 48. Suitable spacing members 54, 56 and retaining members 58, 60 may be provided to hold the bearings in place as clearly shown in Fig. 2.

Referring now particularly to Fig. 1, it will be observed that the driving gear 28 is disposed centrally of the cage 30, the latter being arranged to rotate about the same center as the driven element. The driving gear 28 is arranged to mesh with two idler gears 62, 64 which are rotatably supported and snugly fitted within the cage 30 as best shown in Fig. 3, lateral extensions 66, 68 of the gears being provided with roller bearings 70, 72 supported in the cage, as shown. The three gears 28, 62, 64 fit closely in the cage 30 both laterally and radially so that upon rotation of the driving gear 28, the meshing engagement and fluid-tight confinement thereof cause the gears to act as pumps, when provided with a fluid such as oil, whenever the cage 30 rotates at a slower speed than the driver 28.

The fluid may be contained within a reservoir 74 formed in the lower portion of the housing 10 and from which the fluid may be drawn by the pumping action of the gears through a passageway 76 which leads to an annular chamber 78 in communication with inlet ports 80, 82 formed in the cage 30 as best shown in Fig. 4. The passageway 76 is formed in the stationary bearing member 16 and in an inwardly extended hub portion 84 thereof, the annular chamber 78 being formed within the hub portion and around the shaft 12 as clearly shown in Fig. 2. The hub portion 84 may be of reduced diameter at its inner end and closely fitted within a central bore 86 formed in the half section 36 of the cage 30 to permit rotation of the latter upon the hub. Annular grooves 88 may be provided in the bore 86 to receive packing or sealing rings to prevent escape of the fluid therethrough.

As best shown in Fig. 1, the fluid being drawn through the inlet ports 80, 82 is carried around in the direction of the arrows and discharged into pressure chambers 90, 92 formed in the cage 30. Thus, if the fluid being discharged into the chambers 90, 92 is restrained from flowing or escaping therefrom, a pressure is built up in the chambers which reacts against the idler gears 62, 64 carried by the cage 30 so that the latter are restrained from further rotation about their own axes and the cage 30 is forced to rotate at substantially the same speed as the driving gear 28, assuming that no appreciable resistance is encountered by the driven member or cage 30. However, if the rotation of the cage is resisted to the extent that it is forced to slow down, the idler gears 62, 64 would again rotate upon their own axes causing them to act as pumps to increase the pressure in the chambers 90, 92. Under such conditions it will be seen that if no provision is made for relieving the static pressure being built up in the chambers, a state would be reached where the driver 28 would be forced to slow down, and a maximum resistance to rotation would eventually stall the prime mover.

In accordance with the present invention, provision is made for relieving some of the pressure in the chambers 90, 92 and for utilizing the kinetic energy in the flow of the escaping fluid to assist in rotating either the driving or the driven member or both thus increasing the torque of the driven member at the reduced speed. As herein shown, this is accomplished by a valve unit 94 provided for each chamber 90, 92 which is arranged to uncover successive ports 96, 97, 98, 99 as the pressure in the chamber is increased, the ports communicating with nozzles 100 terminating at the periphery of the cage 30. In the embodiment of the invention illustrated in Figs. 1 to 5, the fluid being discharged through the nozzles 100 is arranged to impinge against a stationary ring or splitter vane 102 which may be keyed to the inside of the housing 10 and held in place by an annular member 104 attached to the housing by bolts 105. As illustrated in Fig. 5, the splitter vane 102 encircles the cage 30 and is designed to divide the jet being discharged from the nozzles 100 into two streams which reverse themselves in direction and react back against curved channels 106 formed in the rim of the rotating element or cage 30, the fluid then escaping into the reservoir to be recirculated. Thus, the major portion of the kinetic energy of the stream of fluid issuing from the nozzles 100 is recovered to do useful work and this energy added to the torque imparted to the driven element 30 by the pump reaction above described effects an increase in the torque exerted upon the driven element at the reduced speed as compared with the torque of the driver.

Under certain conditions it may be found of advantage to divert the fluid being discharged from the nozzles 100 against the driving member, or, to divide the jet to effect reaction against both the driving and driven elements. For example, when the torque requirements are high, the driven member rotates at minimum speed and the jet velocity is at a maximum and the maximum recovery of jet energy occurs when the velocity of the driven element equals substantially one half that of the jet velocity. Under such conditions, more efficient reaction may be obtained by directing the discharged fluid against the driving element, or, against both the driving and driven elements. Thus, as diagrammatically illustrated in Fig. 6, the fluid being discharged from the nozzles 100 may be directed against stationary elements or vanes 200 arranged to guide the fluid against a turbine wheel 202 fast on the driving element 12. In the embodiment diagrammatically illustrated in Fig. 7, the stationary vanes 204 are designed to direct a portion of the jet against curved channels formed in a member 206 fast on the driven element and, a portion against the turbine wheel 202 fast on the driving element.

As herein shown, each valve unit 94 comprises a hollow piston 108 slidingly fitted in a cylindrical bore 110 and which is urged in a direction to close the ports 96, 97, 98, 99 by a spring 112 interposed between the end of the bore 110 and the head of the piston 108. In order to make the above action take place smoothly and without too great a build up in pressure in the chambers 90, 92, the head of the piston 108 is provided with a small port 114 which permits fluid to enter behind the piston into the cylinder chamber 116 and be discharged through an orifice 118 into a second chamber 120 from which the fluid is permitted to escape through a small channel 122 to be discharged into the housing 10. The second chamber 120 is formed within a tube 124 held in a smaller bore at the end of the cylinder chamber 116 and extended into the latter. The piston 108 is also provided with a tapered stem 126 which extends through the orifice 118 and is arranged so that as the piston is forced back the discharge orifice 118 increases in area, thus increasing the unbalanced pressure between the pressure chamber 90 or 92 and the cylinder chamber 116. With this construction, a relatively light spring 112 may be employed to hold the piston 108 against its seat against relatively high pressures in chambers 90, 92, and the valve unit may be operated so that until considerable torque is developed by the driver 28, the driven element 30 will rotate at substantially the same speed as the driver. Furthermore, with only a moderate increase in torque demanded, the piston valve will start to open, lowering the speed of the cage 30 relative to the driver 28 but with a proportionate increase in torque delivered. In other words, the fluid entering through the relatively small opening 114 into the chamber 116 forms a cushion of oil behind the piston 108 which assists the spring 112 in resisting movement of the piston, thus preventing opening of the valve until a considerable amount of pressure is built up in the chamber 90, 92 and permitting a relatively light spring to be employed to resist initial opening of the valve. However, since the fluid in the chamber 116 is continuously escaping through the restricted orifice 118 the piston 108 is permitted to open upon a moderate increase in the pressure in the chamber 90, 92, and since the orifice 118 is automatically enlarged upon movement of the piston to permit faster escape of the fluid in the chamber 116 it will be seen that the resistance to opening of the valve is further reduced so that with only a moderate increase in torque demanded and consequent increase in pressure in the chamber 90, 92, the piston will be permitted to open still further.

From the description thus far it will be observed that in the operation of the device when the pressure in the chamber 90, 92 is caused to rise in response to progressively increasing resistance to rotation of the driven element 30, the piston valves 108 are caused to move to open the nozzle channels or ports 96, 97, 98, 99 successively. It will also be observed that the speed of the driven element 30 is reduced in proportion to the flow of fluid through the chambers 90, 92 and the associated ports since the idler gears 62, 64 are forced to rotate about their axes at increasing speed as the volume of the fluid pumped increases. The pressure in the chambers 90, 92 is highest, however, when all the ports 96, 97, 98, 99 are fully opened.

In certain applications of the device, such as in the propulsion of automotive equipment, a relieving device may be provided to enable the driving member 28 to turn over at low speed, such as in starting the motor and in idling, without developing more than a small amount of torque. As herein shown, the relieving device may comprise a valve unit 130 provided for each chamber 90, 92 which includes a lightly spring pressed valve member 132, the latter permitting the flow of a small volume of fluid from the chambers 90, 92 into the housing when the pressure in the chambers is relatively low. Upon speeding up of the driver 28 with a corresponding increase in fluid pressure in the chambers, the valve member 132 is forced against its seat 134 thus preventing further escape of fluid until the pressure in the chambers 90, 92 is again reduced to idling proportions.

From the above description it will be observed that the present torque converter is adapted for use generally where torque and not constant speed is required such as in pumping equipment, fans, machine tools, boat drives and automobile drives. It will also be observed that the present device enables the torque and H. P. of the driving member or prime mover to be transmitted substantially unimpaired when the driven element is rotated at substantially the same speed as the driving element, and enables the torque of the driven element to be substantially increased when the latter is driven at a lower speed than the driver.

It will also be observed that the present novel structure for increasing the torque of the driven element without substantial loss of input energy is unique in that a major portion of the input energy is transmitted directly to the driven element 30 through the locking action of the idler gears 62, 64, and the loss incurred when fluid is discharged through the radial nozzles 100 is of relatively small amount compared to the input energy since the jet energy in itself represents only a portion of the input energy and a very substantial percentage of this is recovered to do useful work.

Although the preferred embodiment of the invention has been illustrated as provided with two idler elements, it will be understood that it is not desired to limit the invention in this respect. Also, the illustrated valve mechanism may be modified by being disposed so that centrifugal force would assist the spring in resisting initial opening at high rotating speeds of the driven element.

While the preferred embodiment of the invention has been herein illustrated and described it will be understood that the invention may be embodied in other forms within the scope of the following claims.

Having thus described the invention, what is claimed is:

1. In an hydraulic torque converter, in combination, a driving member, a driven member, connections between said driving and said driven members including a fluid pressure chamber, cooperating elements adapted to increase the pressure in said chamber as the resistance to rotation of said driven member is increased, pressure responsive means carried by and movable with said driven member associated with said pressure chamber for automatically releasing a portion of said fluid when a predetermined pressure is reached, and means for utilizing the kinetic energy of the fluid being released to assist in driving said driven member whereby to increase the torque of the latter as the resistance to rotation is increased, and means for reducing the resistance offered by said pressure responsive means upon a further and relatively moderate increase in pressure beyond said predetermined initial pressure.

2. In an hydraulic transmission, in combination, a driving element, a driven element, a pressure chamber in said driven element, means carried by the driven element adapted to cooperate with said driving element to pump fluid into said chamber and build up a pressure therein, said pressure normally reacting against said pumping means and being rendered operative to effect rotation of said driven element, said pumping means being operative to increase the pressure in said chamber as the resistance to rotation of said driven element is increased, pressure responsive means carried by and movable with said driven member associated with said chamber for automatically releasing a portion of said fluid when a predetermined pressure is reached, and means for directing the released fluid in a manner such as to assist in rotating said driven element whereby to increase the torque of the latter as the resistance to rotation is increased, and means for reducing the resistance offered by said pressure responsive means upon a further and relatively moderate increase in pressure beyond said predetermined initial pressure.

3. In an hydraulic transmission, in combination, a driving gear, a driven member, a pressure chamber in said driven member, an idler gear carried by the driven member and arranged to mesh with said driving gear to pump fluid into said chamber and to build up a pressure therein, said pressure normally reacting against said pump and being operated to effect rotation of said driven member, said pump means being effective to increase the pressure in said chamber when the resistance to rotation of said driven member is increased and the driven member is reduced in speed, a valve carried by and movable with said driven member associated with said chamber responsive to variations in said pressure, a plurality of ports arranged to be opened successively by said valve for releasing portions of the fluid from said chamber as the pressure therein is increased, and means for directing the fluid being released in a manner such as to assist in rotating the driven member whereby to increase the torque of the latter in accordance with the resistance to rotation and the reduction in speed of said driven member, said valve being arranged to resist initial opening until a predetermined pressure is reached, and means for reducing the resistance offered by said valve upon a further and relatively moderate increase in pressure beyond said predetermined initial pressure.

4. In an hydraulic transmission, in combination, a driving gear, a driven member, a pressure chamber in said driven member, an idler gear carried by the driven member and arranged to mesh with said driving gear to pump fluid into said chamber and to build up a pressure therein, said pressure normally reacting against said pump and being operated to effect rotation of said driven member, said pump means being effective to increase the pressure in said chamber when the resistance to rotation of said driven member is increased and the driven member is reduced in speed, a valve associated with said chamber responsive to variations in said pressure, a plurality of ports arranged to be opened successively by said valve for releasing portions of the fluid from said chamber as the pressure therein is increased, means for directing the fluid being released in a manner such as to assist in rotating the driven member, comprising a stationary member having buckets which receive the fluid being released and redirect it to cause it to react against the periphery of said driven member to assist in rotating the same, said valve being arranged to resist initial opening until a predetermined pressure is reached, and means for reducing the resistance offered by said valve upon a further and relatively moderate increase in pressure beyond said predetermined initial pressure.

5. In an hydraulic transmission, in combination, a driving member, a driven member, connections between said driving and driven members including a fluid pressure chamber, cooperating elements on said driving and driven members adapted to increase the pressure in said chamber as the resistance to rotation of said driven member is increased and its speed is reduced, a spring-pressed valve carried by and movable with said driven member associated with said chamber and responsive to variations in pressure therein, a plurality of outlets arranged to be successively opened by said valve as the pressure is increased for releasing portions of said fluid, means for utilizing the kinetic energy of the fluid being released to assist in driving said driven member whereby to increase the torque of the latter as its speed is reduced and its resistance to rotation is increased, said valve being arranged to resist initial opening until a predetermined pressure is reached, and means for reducing the resistance offered by said valve upon a further and relatively moderate increase in pressure beyond said predetermined initial pressure.

6. In an hydraulic transmission, in combination, a driving member, a driven member, connections between said driving and driven members including a fluid pressure chamber, cooperating elements on said driving and driven members adapted to increase the pressure in said chamber as the resistance to rotation of said driven member is increased and its speed is reduced, a spring-pressed valve associated with said chamber and responsive to variations in pressure therein, a plurality of outlets arranged to be successively opened by said valve as the pressure is increased for releasing portions of said fluid, means for utilizing the kinetic energy of the fluid being released to assist in driving said driven member whereby to increase the torque of the latter as its speed is reduced and its resistance to rotation is increased, said valve being slidingly mounted in a cylinder chamber and provided with a relatively small opening communicating with said pressure chamber to permit fluid to enter behind said valve and into said cylinder chamber, a restricted escape orifice in said cylinder chamber arranged to retain sufficient fluid behind the valve at a reduced pressure to serve as a cushion to assist the spring in resisting initial opening of the valve until a relatively high pressure is developed in said pressure chamber, and means movable with said valve for automatically enlarging said fluid escape orifice as the valve is opened whereby to further reduce the pressure in said cylinder chamber upon opening of the valve.

7. In an hydraulic torque converter, in combination, a driving element, a driven element, a pressure chamber in said driven element, means carried by said driven element and cooperating with said driving element adapted to build up a pressure in said chamber when the driven element is rotated at a slower speed than the driving element, and means for releasing a portion of the fluid in said pressure chamber to assist in rotating said driven member whereby to increase the torque thereof as the resistance to rotation of the same is increased and its speed is reduced, said means including a spring-pressed valve, means for maintaining a body of fluid behind said valve and at a lower pressure than the fluid in said chamber whereby to prevent opening of said valve until the pressure differential exceeds a predetermined minimum, and means for reducing the pressure of said body of fluid as the valve is opened in response to increased pressure of the fluid in said chamber.

8. In an hydraulic transmission, in combination, a driving member, a driven member, connections between said driving and driven members including a fluid pressure chamber, cooperating elements on said driving and driven members adapted to increase the pressure in said chamber as the resistance to rotation of said driven member is increased and its speed is reduced, a spring-pressed valve carried by and movable with said driven member associated with said chamber and responsive to variations in pressure therein, a plurality of outlets arranged to be successively opened by said valve as the pressure is increased for releasing portions of said fluid, means for utilizing the kinetic energy of the fluid being released to assist in driving said driven member whereby to increase the torque of the latter as its speed is reduced and its resistance to rotation is increased comprising a stationary member having buckets which receive the fluid being released and redirect it to cause it to react against the periphery of said driven member to assist in rotating the same, and a second valve associated with said pressure chamber adapted to permit a small volume of fluid to pass from said chamber at relatively low pressures such as are developed at idling speeds of said driving member, and arranged to close upon speeding up of the driver with the corresponding increase in pressure in said chamber and to remain closed until the pressure in said chamber is again dropped to idling proportions said first valve being arranged to resist initial opening until a predetermined pressure is reached, and means for reducing the resistance offered by said first valve upon a further and relatively moderate increase in pressure beyond said predetermined initial pressure.

9. In an hydraulic torque converter, in combination, a driving member, a driven member, connections between said driving and said driven members including a fluid pressure chamber, cooperating elements on said driving and driven members adapted to increase the pressure in said chamber as the resistance to rotation of said driven member is increased, pressure responsive means associated with said pressure chamber for automatically releasing a portion of said fluid when a predetermined pressure is reached, means for reducing the resistance offered by said pressure responsive means upon a further and relatively moderate increase in pressure beyond said predetermined initial pressure, and means for utilizing the kinetic energy of the fluid being released to increase the torque of the driven member as the resistance to rotation is increased, said last named means comprising a stationary member having buckets which receive the fluid being released and redirect it to cause it to react against the periphery of said driven member to assist in rotating the same.

10. In an hydraulic torque converter, in combination, a driving element, a driven element, a pressure chamber in said driven element, means carried by said driven element and cooperating with said driving element adapted to build up a pressure in said chamber when the driven element is rotated at a slower speed than the driving element, pressure responsive means for releasing a portion of the fluid in said pressure chamber when a predetermined pressure is reached, means for reducing the resistance offered by said pressure responsive means upon a further and relatively moderate increase in pressure beyond said predetermined initial pressure, and means for directing the released fluid in a manner such as to assist in rotating said driving element, said last named means comprising a stationary member having buckets which receive the fluid being released and redirect it to cause it to react against the periphery of said driving element to assist in rotating the same.

11. In an hydraulic torque converter, in combination, a driving element, a driven element, a pressure chamber in said driven element, means carried by said driven element and cooperating with said driving element adapted to build up a pressure in said chamber when the driven element is rotated at a slower speed than the driving element, means for releasing a portion of the fluid in said pressure chamber when a predetermined pressure is reached, and means for directing the released fluid in a manner such as to assist in rotating said driven and driving elements, said last named means comprising a stationary member having buckets which receive the fluid being released and redirect it to cause it to react against said driving and driven elements.

12. In an hydraulic torque converter, in combination, a driving element, a driven element, a pressure chamber in said driven element, means carried by said driven element and cooperating with said driving element adapted to build up a pressure in said chamber when the driven element is rotated at a slower speed than the driving element, pressure responsive means carried by and movable with said driven member for releasing a portion of the fluid in said pressure chamber when a predetermined pressure is reached, means for reducing the resistance offered by said pressure responsive means upon a further and relatively moderate increase in pressure beyond said predetermined initial pressure, and means for directing the released fluid in a manner such as to assist in rotating one of said elements.

13. In an hydraulic torque converter, in combination, a driving element, a driven element, a pressure chamber in said driven element, means carried by said driven element and cooperating with said driving element adapted to build up a pressure in said chamber when the driven element is rotated at a slower speed than the driving element, pressure responsive means carried by and movable with said driven member for releasing a portion of the fluid in said pressure chamber when a predetermined pressure is reached, means for reducing the resistance offered by said pressure responsive means upon a further and relatively moderate increase in pressure beyond said predetermined initial pressure, and means for directing the released fluid in a manner such as to recover a substantial portion of the kinetic energy of the fluid being released.

BRYANT BANNISTER.

REFERENCES CITED

The following references are of record in the file of this patent:

UNITED STATES PATENTS

| Number | Name | Date |
|---|---|---|
| 1,062,876 | Blymer | May 27, 1913 |
| 1,855,222 | Chase | Apr. 26, 1932 |
| 2,067,457 | Morgan | Jan. 12, 1937 |
| 2,329,594 | Corrigan | Sept. 14, 1943 |

FOREIGN PATENTS

| Number | Country | Date |
|---|---|---|
| 846,977 | France | June 19, 1939 |